United States Patent [19]
Greer

[11] 3,852,499
[45] Dec. 3, 1974

[54] RESIN ACID MODIFIED OILSEED MEAL
[75] Inventor: Frances A. Greer, Grayslake, Ill.
[73] Assignee: International Minerals & Chemical Corporation, Libertyville, Ill.
[22] Filed: Nov. 28, 1969
[21] Appl. No.: 880,916

[52] U.S. Cl. ................... 426/93, 426/151, 426/227, 426/335, 426/377
[51] Int. Cl. .......................... A23k 1/10, A23l 1/36
[58] Field of Search ............ 99/2 R, 20 E, 154, 166, 99/167, 168, 14, 17, 98, 126; 260/27 EVA, 123.5; 106/241, 218; 426/93, 151, 227, 335, 377

[56] References Cited
UNITED STATES PATENTS

| | | | |
|---|---|---|---|
| 1,724,695 | 8/1929 | Davidson | 99/98 X |
| 2,128,973 | 9/1938 | Tisdale et al. | 99/166 |
| 2,950,976 | 8/1960 | Kher | 99/166 |
| 3,492,398 | 1/1970 | Marco et al. | 99/2 X |
| 3,541,204 | 11/1970 | Sibbald et al. | 99/2 X |

Primary Examiner—Norman Yudkoff
Attorney, Agent, or Firm—James E. Wolber; Peter Andress

[57] ABSTRACT

Oilseed protein is modified with resin acid compounds to protect the protein from attack by microorganisms such as those encountered in the rumen of a ruminant. The modified protein is available for digestion by gastric enzymes.

14 Claims, No Drawings

RESIN ACID MODIFIED OILSEED MEAL

BACKGROUND OF THE INVENTION

Ruminants, such as cattle, sheep, goats and the like have multichamber stomachs and rely on symbiotic microorganisms as their primary source of protein. The stomach of a cow, for example, contains four chambers, the rumen, the reticulum, the omasum and the abomasum. In ruminants, the rumen and abomasum are the largest chambers and the most important for the purpose of the present discussion.

Microorganisms flourish in the rumen (having a pH of between about 6 and 7) and rely on the food ingested by the ruminant for their nutrition. The nutrients ingested by the ruminant, including proteins, enter the rumen and are utilized by the microorganisms to synthesize bacterial and protozoal protein. Rumen microorganisms ultimately pass to the abomasum (having a pH of between about 2 and about 3) where the microorganisms are digested by gastric enzymes. Much of the protein digested by the ruminant in the abomasum is supplied by the microorganisms which flourish in the rumen.

The synthesis of protein by the microorganisms that grow in the rumen permits the ruminant to live on poor quality diets. These microorganisms, however, often substantially prevent the ruminant from obtaining the benefit of a high protein diet. If protein, and particularly oilseed meal protein, in excess of that required by the microorganisms is ingested by the ruminant, such surplus protein is frequently degraded to ammonia or protein fragments which are excreted by the animal in waste fluids.

Although the rumen acts as a roadblock to the passage of feed protein into the abomasum wherein microbes are the primary source of protein for digestion, it has been demonstrated that the digestive system of the ruminant readily is capable of utilizing substantially more protein than is supplied by the rumen microorganisms. Tests in which additional protein is added directly to the abomasum through a surgical tube or fistula demonstrate that additional protein can provide significant increases in production, including increases in meat, wool and milk.

In an effort to avoid the adverse effect of the rumen microorganisms on protein, it has been suggested (Australian Pat. application No. 21,096/67) that aldehydes, such as formaldehyde or glutaraldehyde, be reacted with the protein or that sucrose or basic synthetic polymers containing a chargeable nitrogen atom be used to coat the proteins. Formaldehyde appears to be preferred and to provide the best protection. The treatment described in the patent application is said to provide protection for the protein during its passage through the rumen while permitting substantial amounts of the protein to be digested in the abomasum and upper intestine. A discussion of the proposal of Australian Pat. application No. 21,096/67 also appears in Rural Research in CSIRO, No. 61, pp. 2–6, (March, 1968).

The problem of providing a protected protein is brought more sharply into focus when the residence times in the rumen and abomasum are considered. The residence time within the rumen for normal feedstuffs may approximate 20 to 24 hours, whereas the residence time in the abomasum and upper intestine where digestion occurs may range from about 2 to about 4 hours. The protein, therefore, must be protected in a hostile environment for an extended period of time yet be available for relatively rapid digestion by the ruminant.

DESCRIPTION OF THE INVENTION

It is a primary object of this invention to provide a modified oilseed protein that will not be destroyed by the action of microorganisms but will be available for digestion.

It is a further object of this invention to provide a modified oilseed protein that will not be destroyed by the action of microorganisms but will be available for digestion by the gastric juices of an animal employing a modifying agent that is effective in minor proportions.

It is an additional object of this invention to provide a method for modifying oilseed protein to render the oilseed protein resistant to attack by microorganisms without materially adversely affecting the digestion of the protein by the gastric juices of an animal.

This invention comtemplates an animal nutrient comprising an oilseed protein having substantially evenly distributed on its surface an effective amount of a resin acid compound selected from the group consisting of resin acids, hydrogenated resin acids, dehydrogenated resin acids, dimerized resin acids, mixtures of said compounds and divalent metal salts thereof, whereby the protein is substantially protected from attack by microorganisms but is available for digestion by the gastric juices of an animal.

The precise mechanism by which the resin acids protect the protein is not entirely understood, particularly in view of the fact that effective protection may be achieved with quite small amounts of resin acids. Data demonstrate that the resin acids are not irreversibly bound to the protein as may be the case with a portion of formaldehyde used to treat proteins (Biochemistry J., 44, 17–23, 1949), and the minor proportions of resin acids required compare quite favorably with the 20 percent and 48 percent by weight of polybasic polymers employed in Australian Pat. No. 21,096/67.

The present invention is generally applicable to the protection of oilseed protein, which includes, without limitation, the protein of soybean meal, cottonseed meal, linseed meal, safflower meal, sunflower meal, peanut meal, and the like. These meals are the byproduct of seed oil production and are the residue following removal of the oil from the seed. Generally, the oilseed meals contain from about 40 percent to about 60 percent by weight of protein. The invention is applicable to the oilseed meals, to the meals from which a portion of the fiber, or the like, has been removed, or to oilseed protein substantially free of non-nitrogen components.

The term resin acid is employed herein in its normal technical sense and refers to diterpenoid monocarboxylic derivatives of alkylated hydrophenanthrenes. Resin acids occur in rosin with the two most common resin acids being abietic acid:

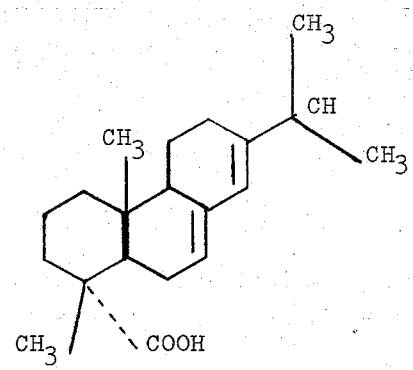

and pimaric acid:

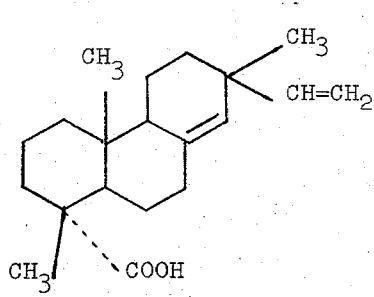

In addition to resin acids, per se, hydrogenated resin acids, dehydrogenated resin acids, dimerized resin acids and mixtures thereof may be employed in the practice of this invention. While any single resin acid may be employed, it is most convenient to employ rosins containing the resin acids for this invention. The resin acids of the rosins, of course, can be modified by hydrogenation, dehydrogenation or dimerization as desired.

The resin acid compounds contemplated for use in this invention are readily available commercially. Hercules, Incorporated, for example, manufactures a series of rosins containing approximately 90 percent resin acids. These include resin acids ("Resin 861"); hydrogenated resin acids ("Staybelite Resin"); highly hydrogenated resin acids ("Foral A"); dehydrogenated resin acids ("Resin 731 D"); and a mixture of about 80 percent dimeric and 20 percent monomeric resin acids ("Dymerex Resin").

For convenience, the invention will be described with reference to resin acids. This description is equally applicable to the above-defined derivatives of resin acids. The invention will also be described with respect to oilseed protein, and is equally applicable to oilseed meal or to the protein from which a portion or all of the non-nitrogen components of the meal have been removed. Proportions of resin acids to be employed are based on the weight of the solid nutrient and are equally applicable to meals or to any protein-containing fraction thereof.

The amount of resin acids to be employed may vary but, generally, at least about 0.5 percent by weight of resin acid based on the weight of the oilseed protein will be employed. Although there is no fixed upper limit, amounts of resin acids in excess of about 10 percent by weight provide no benefit for the additional expense involved. In a preferred embodiment of this invention, resin acids are employed in amounts from about 1.5 percent to about 5 percent by weight based on the weight of the nutrient. The precise amount of any given resin acid to be employed is within the skill of the routineer. When meals are treated the weight of resin acids to be employed may be based on the total weight of solids (e.g. oilseed meal).

This invention also contemplates the method of preparing a nutrient comprising forming a solution containing the acid moiety of a resin acid compound selected from the group consisting of resin acids, hydrogenated resin acids, dehydrogenated resin acids, dimerized resin acids, and mixtures of the said compounds and depositing from said solution said resin acid compounds or divalent metal salts thereof substantially evenly distributed on the surface of particulate oilseed protein.

In one specific embodiment, any resin acid compound may be dissolved in a volatile solvent and the solution may be sprayed into a chamber onto a tumbling bed of oilseed protein where the solvent is rapidly evaporated to deposit the resin acid compound onto the nutrient. The volatile solvent functions merely as a solvent for the resin acid compound and is removed by rapid evaporation. Volatile solvents for resin acid compounds are known and include, inter alia, alcohols such as methyl alcohol and ethyl alcohol; ketones such as acetone and methyl ethyl ketone; esters such as methyl acetate; and hydrocarbons such as pentane and hexane. Evaporation may be accomplished by heat, vacuum or a combination of the two. Standard techniques for drying known to the art may be employed.

Two additional methods of modifying oilseed protein employ an aqueous system. In these methods oilseed protein is suspended in an aqueous solution of a water-soluble alkali metal salt of the resin acid, such as, for example, a sodium or potassium salt of resin acid. In one method, the aqueous system is treated with a mineral acid such as hydrochloric acid, sulfuric acid, phosphoric acid, or the like, to convert the soluble resinate to an insoluble resin acid which deposits onto the suspended oilseed protein. The modified oilseed protein so produced then is separated from the solution and dried.

In a preferred embodiment, a soluble salt such as a chloride or sulfate of a divalent cation is added to the solution to form an insoluble divalent salt of the resin acid and deposit the resin acid on the surface of suspended nutrient particles. The modified oilseed protein then is separated and dried. Since all divalent cations can insolubilize the resin acids, any cation (non-toxic at the levels of use) may be employed, including magnesium, calcium, zinc, barium, copper and the like. Cations such as calcium, magnesium and copper preferably are employed since these divalent cations are nutritionally desirable. Modified oilseed protein made according to this method not only supplies protein, but may also supply a useful metal cation to the abomasum of the ruminant. The fine results obtained employing divalent metal cations suggest the possibility that a ternary complex of protein-metal-resin acid is formed.

In either of the above methods, the alkali metal inorganic salt formed is soluble and does not interfere with the separation of the modified nutrient. If desired, however, the salt can be dried on the oilseed protein. Since the protein may include some soluble fractions, the contact time with the aqueous system is preferably maintained at a minimum. While the particle size being treated is not critical, best results are achieved if substantially all the particles will pass through a 10 mesh screen (Tyler mesh size).

The modified proteins of this invention can be fed alone or can be added to any standard feed. Ruminant feeds may also desirably contain some protein that is digested in the rumen in order to support the symbiotic microorganisms therein. Animal feeds normally will contain carbon, nitrogen and mineral sources, and, if desired, vitamins and the like. Since modified oilseed protein prepared according to this invention is in the form of particulate, free-flowing solids it readily can be admixed with animal feeds employing standard equipment.

The following examples are included for illustrative purposes only, and are not intended to limit the scope of the invention.

Modified soybean meal was prepared by depositing resin acid compounds from a volatile solvent and by depositing resin acid compounds from an aqueous solution. The methods of preparation are described in Examples I, II and III.

EXAMPLE I

A dilute methyl alcohol solution of resin acid compound was sprayed into a rotating globe onto a tumbling bed of particulate soybean meal (predominantly −16 mesh) until the appropriate amount of resin acid compound was added to the meal. An infra-red light was used during the process to add heat and drive off the volatile alcohol. The dry product was free-flowing.

A 0.7 percent by weight resin acid solution was used for 1.8 percent coatings and a 1.8 percent solution was used for 4.5 percent coatings.

EXAMPLE II

An aqueous solution containing approximately 0.5 percent of resin acid compound was prepared by stirring the resin acid compound into about 0.14 N solution of NaOH. Thereafter, soybean meal, predominantly −16 mesh, was added in an amount appropriate to provide the desired final proportions of resin acid compound in the modified soybean meal. The slurry was stirred at room temperature while 0.015 molar solution of divalent metal sulfate was added to deposit the divalent salt of the resin acid compound onto the soybean meal. The modified soybean meal was separated from the aqueous solution and was dried at about room temperature to provide particulate, free-flowing solids.

EXAMPLE III

An aqueous solution containing approximately 0.5 percent of resin acid compound was prepared by stirring the resin acid compund into about a 0.14 N solution of NaOH. Thereafter soybean meal, predominantly −16 mesh, was added in an amount appropriate to provide the desired final proportions of resin acid compound in the modified soybean meal. The slurry was stirred at room temperature while a 0.015 molar sulfuric acid solution was added to deposit the resin acid compound onto the soybean meal. The modified soybean meal was filtered from the aqueous solution and was dried at room temperature to provide particulate, free-flowing solids.

In order to demonstrate the protection afforded by the resin acid compounds, modified soybean meal (50 percent protein) prepared according to this invention was subjected to in vitro rumen tests. In these tests 250 mg of sample was added to 20 ml of McDougall's artificial saliva as a buffer to maintain the pH between 6.8 and 7.0. Cow rumen fluid (5 ml) was then added.

McDougall's saliva was prepared employing 9.8 g — $NaHCO_3$; 7.0 g — $Na_2HPO_4.7H_2O$; 0.57 g — KCl; 0.47 g — NaCl; 0.12 g — $MgSO_4.7H_2O$ and 500 ml of water. Immediately before use 0.04 g of $CaCl_2$ was added and the mixture was diluted with water to provide the saliva having a final volume of 1 liter.

The sample was gassed with $CO_2$ before being maintained at 39°C for the requisite time with periodic shaking. At the end of the desired time period, 1 ml of a 5 percent mercuric chloride solution was added to the sample to terminate biological activity. The sample was centrifuged, the supernatant was decanted, and the residue was washed with water. The sample was centrifuged a second time, the supernatant was discarded and the residue was dried at 70°C overnight.

While 24 hours is the normal duration for a test, in some cases the in vitro test was also conducted for 48 hours to determine if the resin acid compounds still afforded some protection even after this time. Following the test, the nitrogen content of the residue was measured. In order to provide a benchmark by which to gauge the efficacy of this invention, an untreated control was also run. The results are reported in the following Examples. (For convenience, the control run will be included in each of the following Examples).

EXAMPLE IV

The soybean meal was modified with resin acids (Hercules Resin 861) and subjected to the action of rumen fluid. The amount of resin acids employed, the method of depositing the resin acids and the results of the test are shown in Table 1.

TABLE I

| Compound Sample | Resin Acid % | Method[1] | % Undigested Material 24 hr | 48 hr | Protein Content of Residue (%) 24 hr | 48 hr | % Initial Protein Digested 24 hr | 48 hr |
|---|---|---|---|---|---|---|---|---|
| Control | — | — | 50.3 | 21.8 | 68.94 | 51.94 | 21.5 | 62.2 |
| 1 | 1.8 | I | 62.1 | 45.4 | 71.47 | 72.28 | 4.9 | 25.5 |
| 2 | 1.8 | II-Mg | 81.0 | 55.1 | 67.88 | 74.03 | 4.6 | 25.2 |
| 3 | 1.8 | II-Cu | 75.5 | 56.4 | 67.12 | 66.69 | 8.0 | 32.1 |
| 4 | 1.8 | II-Ca | 69.8 | 40.6 | 66.37 | 67.75 | 11.2 | 46.0 |
| 5 | 1.8 | III | 73.0 | 28.8 | 64.31 | 64.25 | 11.4 | 62.7 |

[1]These designations refer to the method of preparation (i.e. Example I, II or III). In the case of meals prepared by Example II, the divalent cation is identified.

EXAMPLE V

The soybean meal was modified with hydrogenated resin acids (Hercules - Staybelite) and subjected to rumen fluid. The results are reported in Table 2.

TABLE 2

| Compound Sample | Resin Acid % | Method | % Undigested Material 24 hr | 48 hr | Protein Content of Residue (%) 24 hr | 48 hr | % Initial Protein Digested 24 hr | 48 hr |
|---|---|---|---|---|---|---|---|---|
| Control | — | — | 50.3 | 21.8 | 68.94 | 51.94 | 21.5 | 62.2 |
| 6 | 1.8 | I | 64.8 | 48.8 | 70.22 | 73.19 | 2.7 | 19.6 |
| 7 | 1.8 | II-Mg | 82.2 | 44.9 | 67.44 | 71.47 | 3.8 | 40.2 |
| 8 | 1.8 | II-Cu | 80.3 | 71.0 | 64.25 | 66.94 | 5.1 | 13.6 |
| 9 | 1.8 | II-Ca | 74.0 | 32.9 | 66.37 | 65.62 | 11.1 | 59.1 |

EXAMPLE VI

The soybean meal was modified with highly hydrogenated resin acids (Hercules - Foral A) and subjected to rumen fluid. The results are reported in Table 3.

TABLE 3

| Compound Sample | Resin Acid % | Method | % Undigested Material 24 hr | 48 hr | Protein Content of Residue (%) 24 hr | 48 hr | % Initial Protein Digested 24 hr | 48 hr |
|---|---|---|---|---|---|---|---|---|
| Control | — | — | 50.3 | 21.8 | 68.94 | 51.94 | 21.5 | 62.2 |
| 10 | 1.8 | I | 76.7 | — | 73.87 | — | 0 | — |
| 11 | 1.8 | I | 63.0 | 45.9 | 71.41 | 74.10 | 3.3 | 22.4 |
| 12 | 4.5 | I | 77.1 | — | 73.12 | — | 0 | — |
| 13 | 1.8 | II-Mg | 67.5 | — | 69.62 | — | 19.0 | — |
| 14 | 1.8 | II-Mg | 76.0 | — | 70.94 | — | 7.6 | — |
| 15 | 1.8 | II-Mg | 75.5 | 31.9 | 71.41 | 63.88 | 6.6 | 6.1 |
| 16 | 1.8 | II-Cu | 81.3 | 65.8 | 64.50 | 69.31 | 5.3 | 18.0 |
| 17 | 1.8 | II-Ca | 63.3 | 18.7 | 66.94 | 55.25 | 20.8 | 69.1 |
| 18 | 1.8 | III | 60.7 | 21.8 | 72.94 | 54.18 | 17.3 | 76.9 |

EXAMPLE VII

The soybean meal was modified with dehydrogenated resin acids (Hercules - Resin 731 D) and subjected to rumen fluid. The results are reported in Table 4.

TABLE 4

| Compound Sample | Resin Acid % | Method | % Undigested Material 24 hr | 48 hr | Protein Content of Residue (%) 24 hr | 48 hr | % Initial Protein Digested 24 hr | 48 hr |
|---|---|---|---|---|---|---|---|---|
| Control | — | — | 50.3 | 21.8 | 68.94 | 51.94 | 21.5 | 62.2 |
| 19 | 1.8 | I | 62.8 | — | 70.25 | — | 9.3 | — |
| 20 | 1.8 | I | 63.8 | 51.4 | 72.44 | 73.82 | 1.1 | 14.8 |
| 21 | 4.5 | I | 76.7 | — | 74.62 | — | 0.0 | — |
| 22 | 1.8 | II-Mg | 78.3 | — | 69.93 | — | 7.6 | — |
| 23 | 1.8 | II-Mg | 78.3 | 56.6 | 66.41 | 72.38 | 5.4 | 18.9 |
| 24 | 1.8 | II-Cu | 76.7 | 60.3 | 65.62 | 69.00 | 6.3 | 22.8 |
| 25 | 1.8 | II-Ca | 62.7 | 24.3 | 65.25 | 57.87 | 21.5 | 71.5 |

EXAMPLE VIII

The soybean meal was modified with a mixture of 80 percent dimerized resin acids and 20 percent monomeric resin acids (Hercules - Dymerex) and subjected to rumen fluid. The results are reported in Table 5.

TABLE 5

| Compound Sample | Resin Acid % | Method | % Undigested Material 24 hr | 48 hr | Protein Content of Residue (%) 24 hr | 48 hr | % Initial Protein Digested 24 hr | 48 hr |
|---|---|---|---|---|---|---|---|---|
| Control | — | — | 50.3 | 21.8 | 68.94 | 51.94 | 21.5 | 62.2 |
| 26 | 1.8 | I | 59.7 | 32.9 | 71.60 | 59.04 | 8.1 | 55.2 |

In order to demonstrate that the modified oilseed protein of this invention is available for digestion by gastric enzymes, several of the above modified soybean meals were subjected to pepsin digestibility tests. These tests employed a modification of a standard AOAC pepsin digestion (described in Chapter 22). In the tests one gram of sample was added to 150 milliliters of pepsin solution containing 0.2 percent pepsin (activity 1:10,000) and 0.075 percent of 1 N HCl. The test was conducted at 45°C for 4 hours with agitation. At the end of the test the nitrogen content of the residue was measured.

EXAMPLE IX

The results of pepsin digestion tests are shown in Table 6 below. For convenience, the results of 24 hour rumen tests on one portion of the sample (if available) are compared with the pepsin digestibility results. The run numbers correlate with the run numbers shown above for the rumen tests.

TABLE 6

| | Resin Acid Compound | | | % Initial Protein Digested | |
|---|---|---|---|---|---|
| Sample | Type | % | Method | 24 Hour Rumen Test | 4 Hour Pepsin Test |
| Control | — | — | — | 21.5 | 92.66 |
| 3 | Resin acid | 1.8 | II-Cu | 8.0 | 92.48 |
| 4 | do. | 1.8 | II-Ca | 11.2 | 91.23 |
| 5 | do. | 1.8 | III | 11.4 | 92.39 |
| 8 | Hydrogenated resin acids | 1.8 | II-Cu | 5.1 | 92.01 |
| 9 | do. | 1.8 | II-Ca | 11.1 | 92.31 |
| 10 | Highly hydrogenated resin acids | 1.8 | I | 0 | 91.05 |
| 13 | do. | 1.8 | II-Mg | 19.0 | 89.14 |
| 14 | Highly hydrogenated resin acids | 1.8 | II-Mg | 7.6 | 91.43 |
| 16 | do. | 1.8 | II-Cu | 5.3 | 92.25 |
| 17 | do. | 1.8 | II-Ca | 20.8 | 92.11 |
| 18 | do. | 1.8 | III | 17.3 | 91.94 |
| 19 | Dehydrogenated resin acid | 1.8 | I | 9.3 | 91.7 |
| 21 | do. | 4.5 | I | 0.0 | 91.53 |
| 22 | do. | 1.8 | II-Mg | 7.6 | 90.65 |
| 24 | do. | 1.8 | II-Cu | 6.3 | 92.49 |
| 25 | do. | 1.8 | II-Ca | 21.5 | 91.63 |

The protein determinations reported in the above tables were obtained in a standard manner by multiplying the total nitrogen (determined by standard combustion methods and checked by Kjeldahl) by the factor 6.25. The close correlation of combustion, Kjeldahl and a commercial amino acid analyzer (Beckman 120C used after the sample was hydrolyzed at 110°C for 16 hours in 6 N HCl) is shown for two undigested residues in Table 7.

TABLE 7

| Sample | Combustion | Kjeldahl | Analyzer |
|---|---|---|---|
| Control | 74.56 | 73.88 | 73.42 |
| Soybean meal modified with 1.8% highly hydrogenated resin acids | 73.87 | 74.12 | 76.73 |

While the modified protein of this invention can be used as a ruminant feedstuff, it also may be used as an additive to aqueous animal feeds. Even though such aqueous systems may have microorganisms growing therein, the modified oilseed protein of this invention would be protected, to some extent, from the action of such microorganisms.

I claim:

1. An animal nutrient consisting essentially of an oilseed meal having substantially evenly distributed on its surface an effective amount of a material selected from the group consisting of resin acids, hydrogenated resin acids, dehydrogenated resin acids, dimerized resin acids, mixtures of said compounds and divalent metal salts thereof, whereby the meal is protected from attack by microorganisms.

2. The nutrient of claim 1 wherein said material is derived from rosin.

3. The nutrient of claim 2 wherein the oilseed meal is soybean meal.

4. The nutrient of claim 1 wherein oilseed meal is modified with said material present in an amount of at least about 0.5 percent by weight of the oilseed meal.

5. The nutrient of claim 1 wherein oilseed meal is modified with said material present in an amount of from about 1.5 percent to about 5 percent by weight based on the weight of the oilseed meal.

6. The nutrient of claim 5 wherein the oilseed meal is soybean meal.

7. The ruminant nutrient of claim 6 wherein said material is present as a divalent metal salt.

8. The nutrient of claim 1 wherein the said material is present as its divalent metal salt.

9. The method of claim 8 in which soybean meal is treated.

10. The method of preparing an animal nutrient composition comprising forming an aqueous solution of an alkali metal salt of a material selected from the group consisting of resin acids, hydrogenated resin acids, dehydrogenated resin acids, dimerized resin acids, and mixtures thereof, suspending particulate oilseed meal in said solution, adding a soluble divalent metal salt to said aqueous solution whereby said material is deposited substantially evenly on the surface of said particulate oilseed meal, separating the thus modified oilseed meal from the solution, and drying the separated modified oilseed meal.

11. The method of claim 10 in which soybean meal is treated.

12. The method of preparing an animal nutrient comprising forming an aqueous solution of an alkali metal salt of a material selected from the group consisting of resin acids, hydrogenated resin acids, dehydrogenated resin acids, dimerized resin acids, and mixtures thereof, suspending particulate oilseed meal in said solution, adding a mineral acid to said aqueous solution whereby the said material is precipitated substantially evenly onto the surface of said particulate oilseed meal, separating the thus modified oilseed meal from the solution, and drying the separated oilseed meal.

13. The method of claim 12 in which soybean meal is treated.

14. The method of preparing an animal nutrient comprising dissolving the acid moiety of a material selected from the group consisting of resin acids, hydrogenated resin acids, dehydrogenated resin acids, dimerized resin acids, and mixtures thereof in a volatile solvent, spraying the resulting solution onto tumbling particulate oilseed meal, and drying the resulting spray particles to provide a modified oilseed meal having the said material substantially evenly distributed on the surface thereof.

* * * * *